(No Model.) 2 Sheets—Sheet 2.
H. A. McGRORY.
LIQUID LEVEL INDICATOR SYSTEM.
No. 480,736. Patented Aug. 16, 1892.
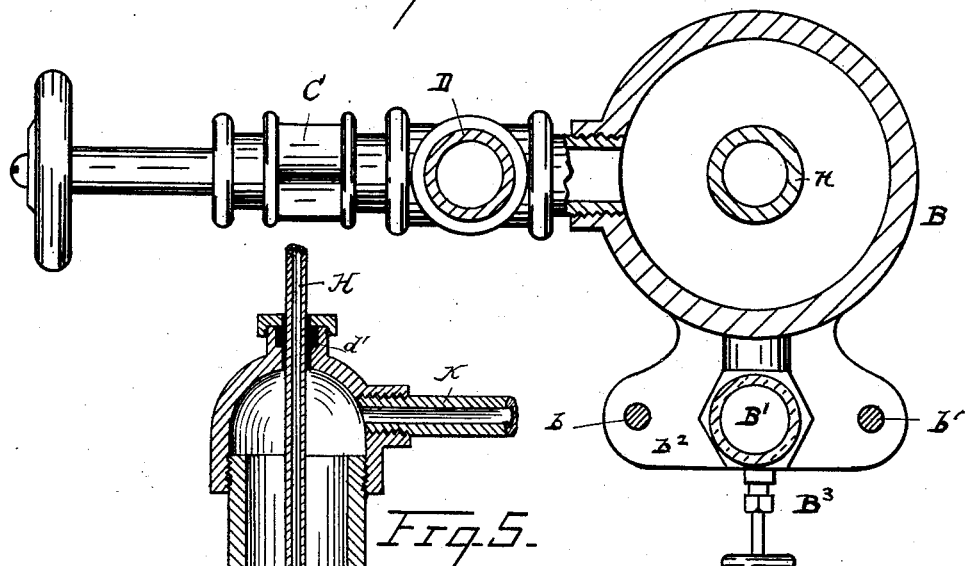
Witnesses
John Schuman.
John F. Miller.
Inventor
Henry A. McGrory
By his Attorney
Newell S. Wright

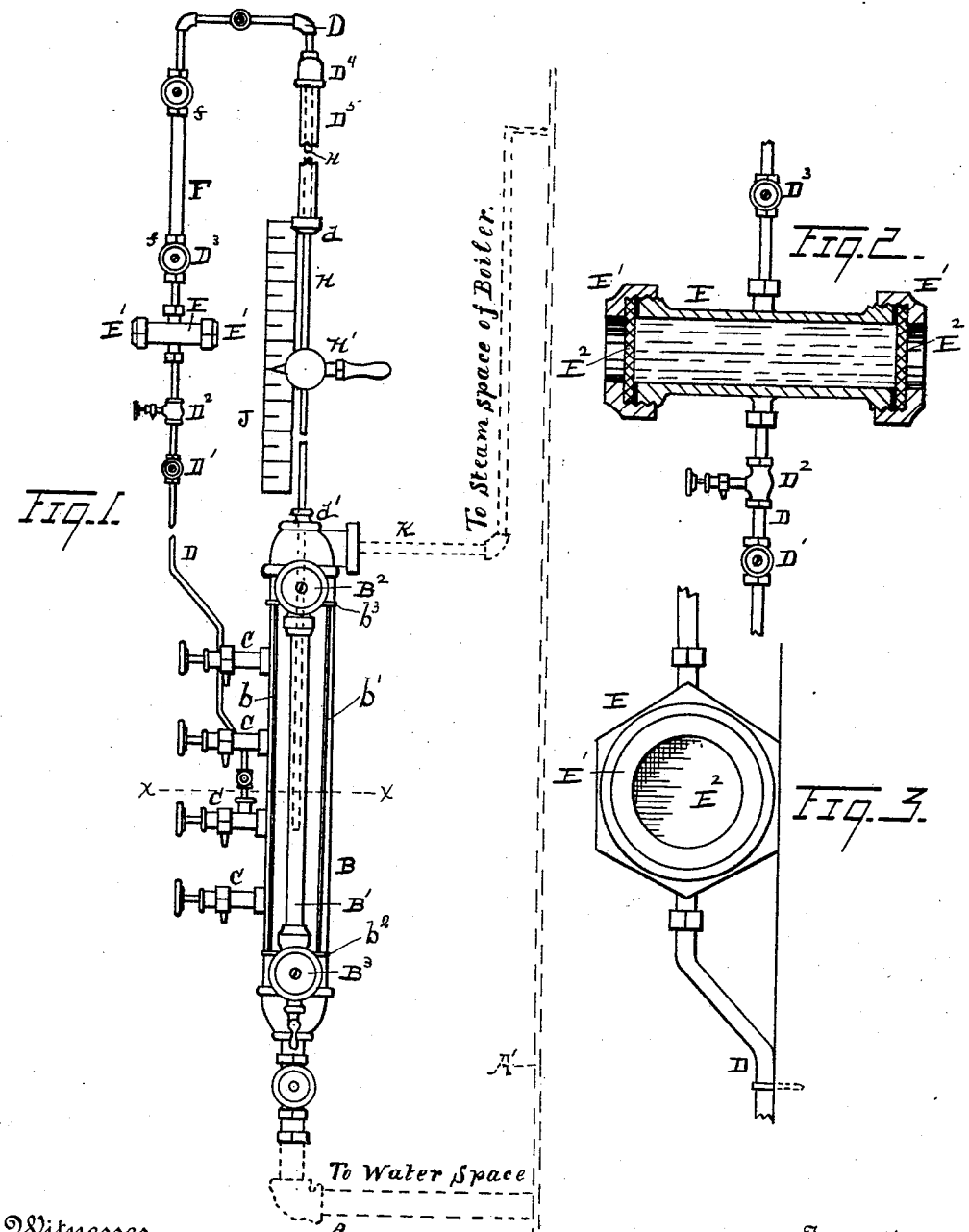

UNITED STATES PATENT OFFICE.

HENRY A. McGRORY, OF DETROIT, MICHIGAN.

LIQUID-LEVEL-INDICATOR SYSTEM.

SPECIFICATION forming part of Letters Patent No. 480,736, dated August 16, 1892.

Application filed August 17, 1891. Serial No. 402,877. (No model.)

*To all whom it may concern:*

Be it known that I, HENRY A. MCGRORY, a citizen of the United States, residing at Detroit, county of Wayne, State of Michigan, have invented a certain new and useful Improvement in Liquid-Level-Indicator Systems; and I declare the following to be a full, clear and exact description of the invention, such as will enable others skilled in the art to which it appertains to make and use the same, reference being had to the accompanying drawings, which form a part of this specification.

My invention relates to certain new and useful improvements in an indicator system for steam-boilers and other purposes; and it consists of the devices and appliances hereinafter specified and claimed, and illustrated in the accompanying drawings, in which—

Figure 1 is a view in elevation and diagram illustrating my invention. Fig. 2 is a vertical longitudinal section of the gage E. Fig. 3 is an end view of the same. Fig. 4 is cross-section on the line $x\,x$, Fig. 1; and Fig. 5 is a longitudinal sectional view of the upper portion of the water-column, showing the relation of the parts to each other and to the column.

The chief object of my invention is to provide an indicator so constructed and arranged that it may be located wherever desired—as, for example, in the engine-room, the pilot-house of a steamboat, the office of a hotel, or at any other desired point distant from the boiler room—so as to afford additional means of precaution to those in common use for always securing an ample amount of water in the boiler. It is obviously needful in such an arrangement to overcome and prevent all liability of freezing in cold weather. My invention is calculated to secure these results in a simple and efficient manner.

To these ends I carry out my invention as follows: A represents a water-pipe leading from the water-space of a boiler, partly shown at A' in dotted lines in Fig. 1, to a water-column B, provided with an ordinary water-gage B', communicating therewith through controlling-valves $B^2\,B^3$ at the extremities thereof. The column B is preferably provided with a series of gage-cocks C and the customary guards $b$ and $b'$, the guard-plates being shown at $b^2$ and $b^3$. The outside vertical lines at either hand of the gage-glass B' indicate the water-column, while the two inner vertical lines adjacent to the gage-glass on either hand indicate the guards $b\,b'$. D is a water-pipe connected with said column. The column with its water-gage and gage-cocks may have their customary location under the inspection of the engineer or foreman.

The water-pipe D may be led wherever desired and communicates at its lower end with the water-column below the low-water level and therethrough with the boiler. D' is a controlling-valve located in said pipe, and $D^2$ a test-cock also located therein.

E denotes a water-indicator located in the pipe D wherever desired, as in the pilot-house, office, or elsewhere. As shown, the water-indicator E may consist of a horizontal tube communicating with the pipe D above and below and provided with suitable tight fittings E' at its extremities and with observation-glasses $E^2$, held snugly in place in said fittings to make the gage E water-tight.

$D^3$ is an additional controlling-valve located in the pipe D above the water-gage E. The pipe D being thus provided with controlling-valves D' $D^3$ above and below the water-gage E, it is evident that should the water-indicator need repairs the pipe D can be readily closed off, so that the parts of the indicator can be separated and repaired, as may be required.

To free the pipe D of air in order that the water may circulate therein, any one of the cocks located therein may be opened to allow the air to be driven out therethrough by the pressure of the water. When the air has been thus relieved therefrom, the cock is closed. The water will continue to be supported by pressure from the boiler until the level in the boiler is below the ends of the tube, when the water in the tube and gages will fall back to the boiler. Instead of employing, however, a horizontal indicator, a vertical indicator-glass, as shown at F, may be employed, connected with the pipe D by suitable fittings $f$. The two forms of indicators and their connections are shown in Fig. 1 for illustration, although I do not contemplate ordinarily the use of but one of them in said pipe. It is evident, however, that as many indicators may be located in the pipe D at different points as may be desired.

To secure circulation through the pipe D, its end opposite from that already described as connected with the water-column B toward its lower end is so conducted and arranged as to communicate with the upper end of said column and therethrough with the boiler again. This, it is evident, will afford a circulation through the pipe D when the water is not too low, and in consequence all liability of freezing in cold weather will be effectually overcome.

While I do not limit myself to any precise manner of effecting the communication of the water-pipe D with the upper end of the water-column B, I prefer to accomplish it in the manner shown in Fig. 1, in which the pipe D is shown provided with a reducer $D^4$ and pipe $D^5$ connected therewith.

H is a hollow pipe having a telescopic connection with the pipe $D^5$ at one end and with the upper end of the column B and made reciprocatory therein, the top of the column B and the base of the pipe $D^5$ being provided with stuffing-boxes, as at $d$ $d'$. The pipe H is provided with a weighted arm (shown at H') to overcome the friction of the pipe in the stuffing-boxes and hold the pipe in normal position. Said arm may also serve as a handle by which the pipe H can be lifted, or any other means may be provided for lifting the same.

J denotes a scale-bar, which may have any desired location to indicate the adjustment of the pipe H up or down.

The lower end of the pipe H is to be adjusted so as to stand at any desired point below which it is desired not to have the water fall in the boiler. So long, therefore, as the water is above the end of the pipe the pipe will be sealed thereby and the water will circulate through the pipes D and H owing to the fact that the water in the more distant portions of the pipe will become cooled and will fall and the hotter water from the boiler will rise to take its place; but should the water in the boiler fall below this point that in the pipes would also fall and steam would take its place and make its presence visible in the gage.

K denotes a steam-pipe communicating with the upper end of the water-column B and with the boiler, preferably with the steam-space thereof. By this construction it is evident that the state of the water can readily be observed and tested. Instead of leading the pipe A directly from the boiler, it may be attached to any part that has circulation of water therein or to any point where circulation can be secured. I would have it understood, also, that I do not limit myself to the use of the column B, nor to that of the adjustable pipe H, as the pipe in which the gage E or F is located may have communication with the boiler at both extremities or with any part where circulation may be secured, in any desired manner within the scope of my invention, with or without the parts B and H. The pipes A and D might in reality be united, the opposite end having return communication with the boiler in any desired manner.

While I have described my invention as applicable to a steam-boiler, it is evident that it may be used in other connections, also, as with oil-tanks or other devices having a pressure to force a liquid above its level, and I would have it understood that I contemplate all uses to which it may be put as coming within the scope of my invention. Therefore I would have it understood that wherever I have used the word "reservoir" throughout the specification and claims I intend that it shall be broad enough to include these different constructions as well as a steam-boiler or the water-column connected therewith.

In an indicator constructed in the manner shown in Fig. 2 a much larger body of water may be contained therein to see through than where a vertical indicator-glass is employed. When the said indicator is empty or has steam therein, it can be seen through; but when it is filled with water its presence prevents seeing therethrough. At the same time such an indicator is more durable and more readily put in place.

What I claim as my invention is—

1. In an indicator system for steam-boilers, &c., the combination, with a reservoir, of a pipe communicating therewith and led to a distance therefrom, an indicator in said pipe distant from the reservoir, said pipe having a return communication with the reservoir, and the extremities of said pipe normally communicating with said reservoir below the water-line to provide for circulation through said pipe, substantially as described.

2. In a water-indicator system for steam-boilers, the combination, with a water-pipe to communicate with the boiler, of a water-column communicating with said pipe, a steam-pipe communicating with the boiler and with the water-column, a series of gage-cocks C, communicating with said column, and an additional water-pipe provided with a water-indicator and communicating with said column, said latter pipe having a return communication with the water-column, the extremities of said additional pipe normally communicating with said column below the water-line, substantially as described.

3. In a water-indicator system for steam-boilers, the combination, with a water-pipe leading from the boiler, of a water-column communicating with said pipe, a steam-pipe communicating with the boiler and water-column, an additional water-pipe leading from said column and having a return communication therewith, and a water-indicator located in said latter pipe, the extremities of said additional pipe normally communicating with the water column below the water-line therein, substantially as described.

4. In a water-indicator system for steam-boilers, the combination, with a water-pipe leading from the boiler, of a water-column communicating therewith, a steam-pipe communicating with the boiler and water-column, an additional water-pipe leading from said column and provided with a water-indicator, and a pipe H, having a movable connection with said additional pipe and with said column, substantially as described.

5. In a water-indicator system for steam-boilers, the combination, with a water-pipe leading from the boiler, of a water-column, a steam-pipe communicating with the boiler and with the water-column, an additional water-pipe leading from said column provided with a water-indicator, a pipe H, having a movable connection with said pipe and with the said column, and means for moving said pipe H, substantially as described.

6. In a water-indicator system for steam-boilers, the combination, with a pipe leading from the boiler, of a water-column connected with said pipe, an additional water-pipe leading from said column provided with a water-indicator, a pipe H, having an adjustable connection with said additional pipe and with said column, and a scale to indicate the adjustment of said pipe H, substantially as described.

7. In a water-indicator system for steam-boilers, the combination, with a pipe leading from the boiler, of a water-column connected with said pipe, an additional pipe leading from said column having a water-indicator located therein, a pipe H, having telescopic connection with said additional pipe and with said column, means to adjust the pipe H, and a pipe leading from the upper end of said column to the boiler, substantially as described.

8. In a water-indicator system for steam-boilers, the combination, with a water-pipe leading from the boiler and having return communication therewith, of a water-indicator located at a point distant from the boiler-room, having communication with said water-pipe, and cocks to control the communication of said gage with said pipe located at each side of said gage, the extremities of said pipe normally communicating with the boiler below the water-line to provide for water-circulation therethrough, substantially as described.

9. The combination, with a pipe having normal communication with a boiler or reservoir below the water-level thereon to provide for circulation therethrough, of the gage E, located therein, said gage consisting of a horizontal tube provided with end fittings, and observation-glasses located at the extremities of said tube and held in place by said fittings, substantially as described.

In testimony whereof I sign this specification in the presence of two witnesses.

HENRY A. McGRORY.

Witnesses:
 N. S. WRIGHT,
 JOHN F. MILLER.